United States Patent
Uken

(10) Patent No.: US 11,318,888 B2
(45) Date of Patent: May 3, 2022

(54) INTERIOR REARVIEW MIRROR ASSEMBLY WITH BATTERY CHARGE LEVEL INDICATOR

(71) Applicant: Magna Mirrors of America, Inc., Holland, MI (US)

(72) Inventor: John T. Uken, Jenison, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/949,382

(22) Filed: Oct. 28, 2020

(65) Prior Publication Data

US 2021/0129757 A1 May 6, 2021

Related U.S. Application Data

(60) Provisional application No. 62/945,265, filed on Dec. 9, 2019, provisional application No. 62/927,711, filed on Oct. 30, 2019.

(51) Int. Cl.
*B60R 1/12* (2006.01)
*B60Q 1/52* (2006.01)
*B60R 1/04* (2006.01)

(52) U.S. Cl.
CPC ............ *B60R 1/1207* (2013.01); *B60Q 1/525* (2013.01); *B60R 1/04* (2013.01)

(58) Field of Classification Search
CPC .. B60R 1/207; B60Q 1/04; B60Q 1/06; B60Q 1/525; B60Q 9/008; B60K 35/00
See application file for complete search history.

(56) References Cited

U.S. PATENT DOCUMENTS

| | | | |
|---|---|---|---|
| 5,066,112 A | 11/1991 | Lynam et al. | |
| 5,140,455 A | 8/1992 | Varaprasad et al. | |
| 5,151,816 A | 9/1992 | Varaprasad et al. | |
| 5,253,109 A | 10/1993 | O'Farrell et al. | |
| 5,530,240 A | 6/1996 | Larson et al. | |
| 6,172,613 B1* | 1/2001 | DeLine | B60K 35/00 340/815.4 |
| 6,294,989 B1 | 9/2001 | Schofield et al. | |
| 6,439,755 B1 | 8/2002 | Fant, Jr. et al. | |
| 6,449,082 B1 | 9/2002 | Agrawal et al. | |
| 6,501,387 B2 | 12/2002 | Skiver et al. | |
| 6,690,268 B2 | 2/2004 | Schofield et al. | |

(Continued)

*Primary Examiner* — Thomas M Sember
(74) *Attorney, Agent, or Firm* — Honigman LLP

(57) ABSTRACT

An interior rearview mirror assembly for an electric vehicle having a vehicle battery for powering a propulsion system of the electric vehicle. The interior rearview mirror assembly includes a mirror casing, a mirror reflective element, a mounting structure configured to adjustably mount the mirror assembly at an interior portion of the electric vehicle, and an indicator disposed at the mirror casing along a perimeter region of the mirror reflective element. The indicator includes a plurality of LEDs, and each LED of the plurality of LEDs is individually operated to emit light. With the mirror reflective element and the mirror casing adjustably mounted at the interior portion of the electric vehicle via the mounting structure, and responsive to a battery charge level of the vehicle battery, the indicator electrically powers one or more of the LEDs to convey vehicle battery charge level information to a driver of the electric vehicle.

18 Claims, 3 Drawing Sheets

(56) References Cited

U.S. PATENT DOCUMENTS

| | | |
|---|---|---|
| 6,731,205 B2 | 5/2004 | Schofield et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,626,749 B2 | 12/2009 | Baur et al. |
| 8,049,640 B2 | 11/2011 | Uken et al. |
| 8,277,059 B2 | 10/2012 | McCabe et al. |
| 8,317,376 B2 | 11/2012 | Hook et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 9,092,986 B2 | 7/2015 | Salomonsson et al. |
| 9,126,525 B2 | 9/2015 | Lynam et al. |
| 9,346,403 B2 | 5/2016 | Uken et al. |
| 9,598,016 B2 | 3/2017 | Blank et al. |
| 10,894,507 B1 * | 1/2021 | Field ..................... C23C 14/352 |
| 2014/0313563 A1 | 10/2014 | Uken et al. |
| 2015/0097955 A1 | 4/2015 | De Wind et al. |
| 2015/0334354 A1 | 11/2015 | Uken et al. |
| 2019/0047475 A1 | 2/2019 | Uken et al. |
| 2019/0106059 A1 | 4/2019 | Wesley et al. |
| 2019/0146297 A1 | 5/2019 | Lynam et al. |

* cited by examiner

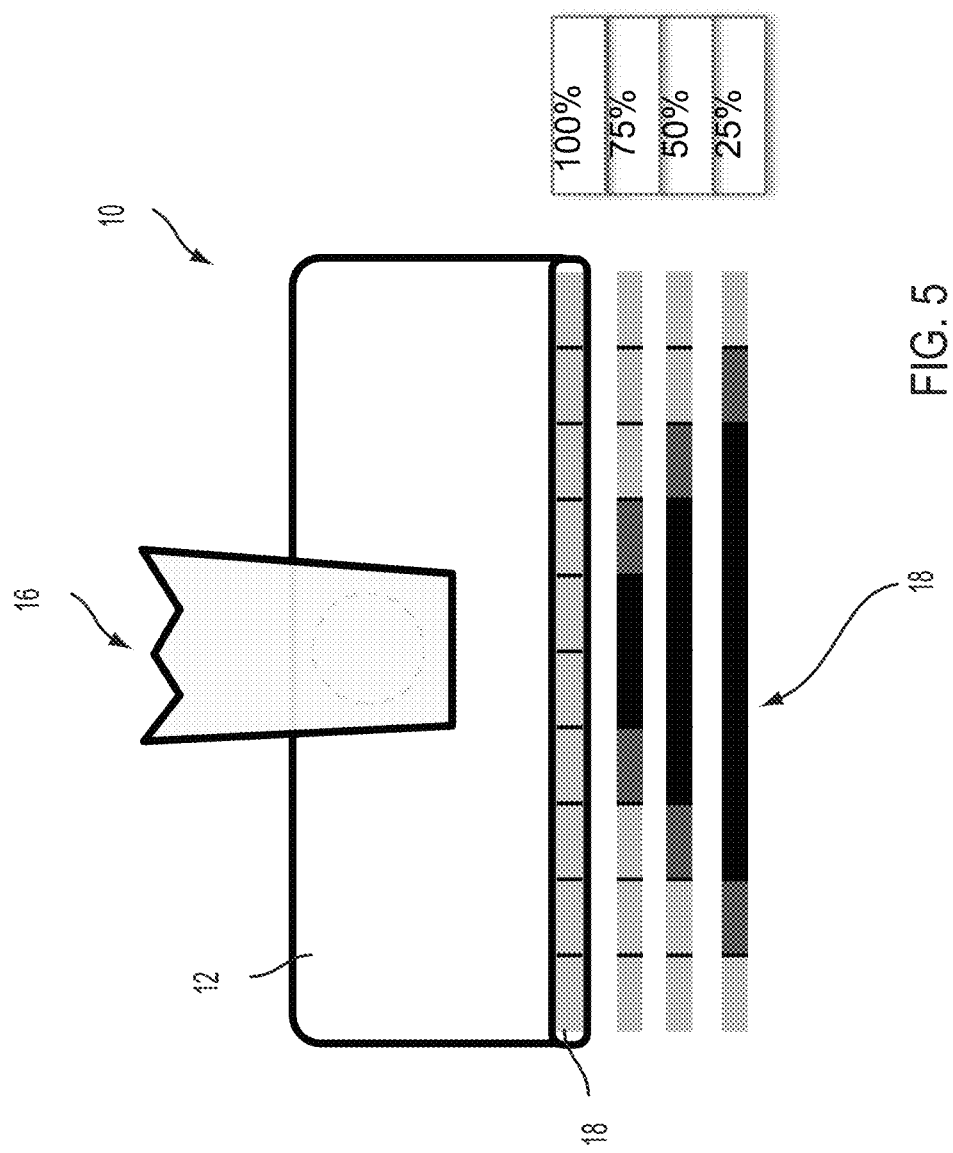

INTERIOR REARVIEW MIRROR ASSEMBLY WITH BATTERY CHARGE LEVEL INDICATOR

CROSS REFERENCE TO RELATED APPLICATIONS

The present application claims the filing benefits of U.S. provisional application Ser. No. 62/945,265, filed on Dec. 9, 2019, and U.S. provisional application Ser. No. 62/927,711, filed Oct. 30, 2019, which are hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a single or double ball pivot or joint mounting configuration where the mirror casing and reflective element are adjusted relative to the interior portion of a vehicle by pivotal movement about the pivot configuration.

SUMMARY OF THE INVENTION

The present invention provides an interior rearview mirror assembly that includes an indicator bar that is operable to indicate a charge level of a vehicle battery of an electric vehicle (such as a vehicle battery for powering a propulsion system of the electric vehicle). The indicator comprises a plurality of light emitting diodes that are individually operated or energized (so as to provide indication of a charge level to a person viewing the mirror assembly) responsive to a signal indicative of the charge level of the vehicle battery. The indicator bar may be disposed along a lower region of the mirror head (such as at or below the mirror casing and at or below the reflective element) so as to be viewable from forward and rearward and sideward of the mirror assembly.

These and other objects, advantages, purposes and features of the present invention will become apparent upon review of the following specification in conjunction with the drawings.

BRIEF DESCRIPTION OF THE DRAWINGS

FIG. 5 is another plan view of the mirror assembly as viewed from outside the vehicle, showing different lighting configurations for indicating various charge levels of the vehicle battery.

DESCRIPTION OF THE PREFERRED EMBODIMENTS

Figure 1:
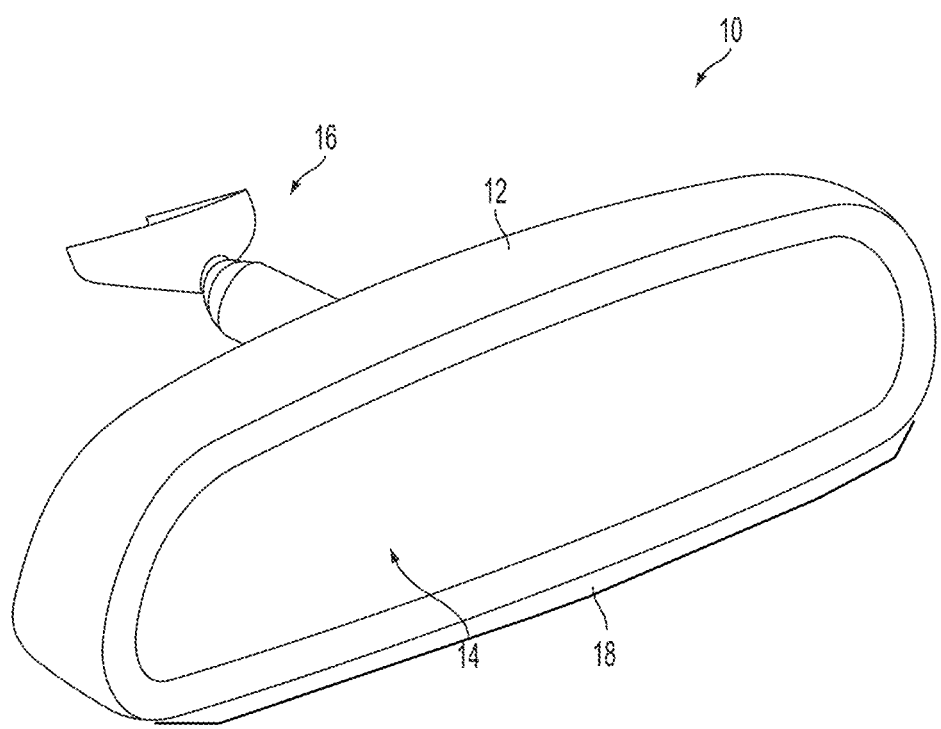
FIG. 1 is a perspective view of an interior rearview mirror assembly in accordance with the present invention.
Figure 4:
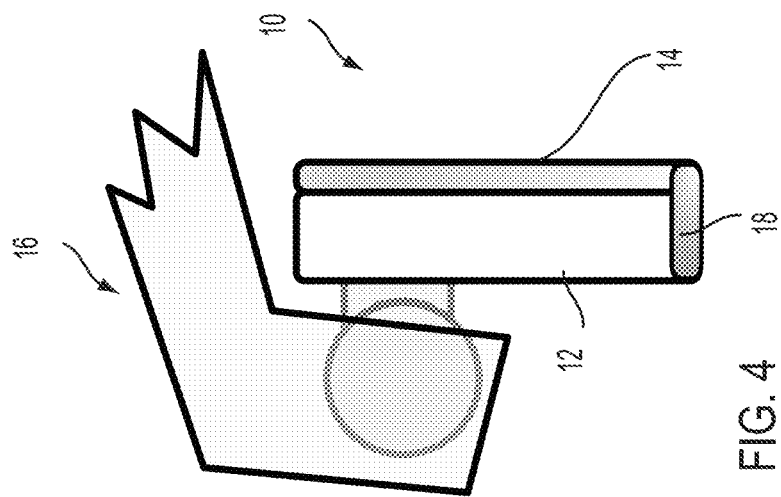
FIG. 4 is a side view of the mirror assembly.
Figure 2:
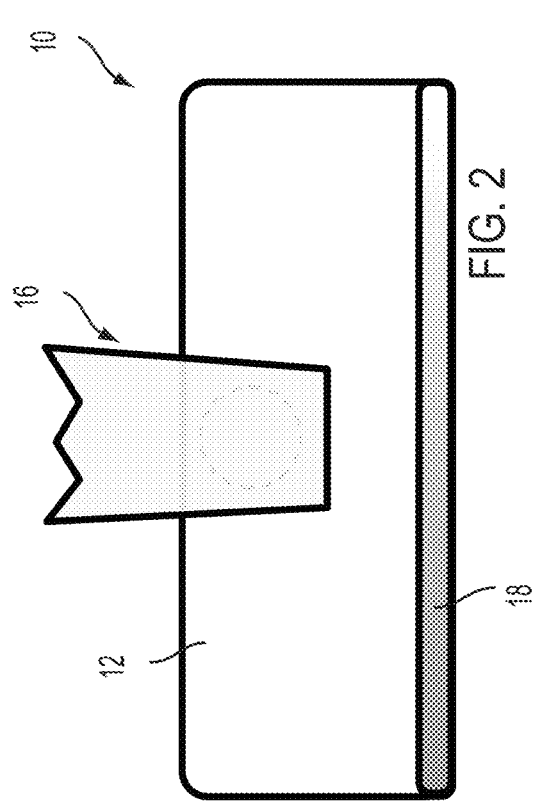
FIG. 2 is a plan view of the mirror head as viewed inside the vehicle.
Figure 3:
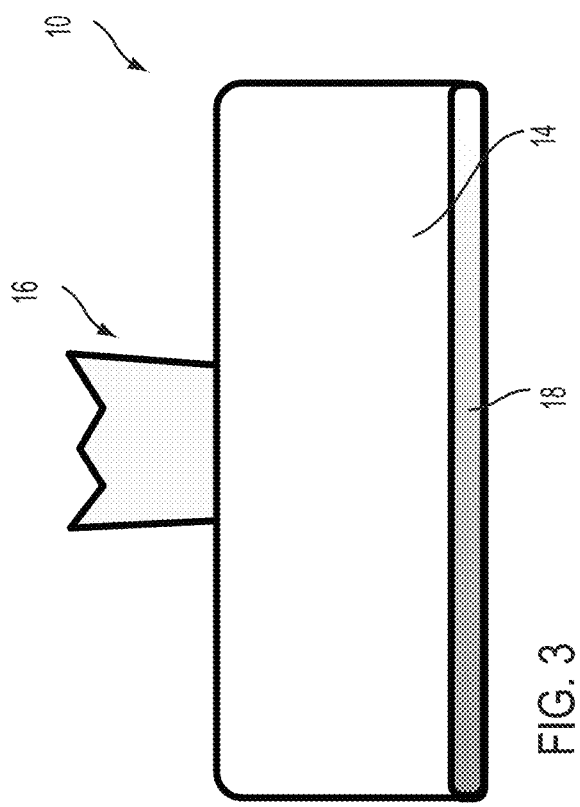
FIG. 3 is a plan view of the mirror assembly as viewed from outside the vehicle.

Referring now to the drawings and the illustrative embodiments depicted therein, an interior rearview mirror assembly 10 for an electric vehicle or hybrid vehicle or battery powered vehicle (where the battery powers at least the propulsion system of the electric vehicle) includes a casing 12 and a reflective element 14 positioned at a front portion of the casing 12 (FIGS. 1-4). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element may comprise a variable reflectance mirror reflective element that varies its reflectance responsive to electrical current applied to conductive coatings or layers of the reflective element, or the mirror reflective element may comprise a prismatic mirror reflective element that is flipped between a daytime position and a nighttime position via a toggle element or mechanism. The mirror head includes a battery charge level indicator bar or indicator module or unit 18 that operates to indicate a charge level of the vehicle battery, as discussed below.

In the illustrated embodiment, the indicator bar 18 is disposed along the lower region or chin of the mirror head and beneath the reflective element 14. The indicator bar 18 includes a plurality of light emitting diodes (LEDs) that are individually electrically powerable or energizable to emit light. The LEDs, when energized, emit light radially out from the lower region of the mirror head such that the emitted light is viewable from forward or rearward or sideward of the mirror assembly.

The indicator or indicator module or unit comprises a row of LEDs across the lateral dimension of the mirror head (when the mirror assembly is mounted in the vehicle), with the LEDs disposed on one or more circuit elements or circuit boards. The indicator includes a light transmissive cover element that is configured to allow light emitted by the LEDs to pass therethrough. The LEDs and cover element may be configured so that light emitted by the individual LEDs passes through respective portions of the cover element (such as shown in FIG. 5), so that as more LEDs are energized as the battery charge level increases (or de-energized as the battery charge level decreases), the number of LEDs energized or not energized can be readily discernible and can indicate the battery charge level. The indicator may further include a processor or controller that provides the appropriate output to the LEDs based on the received signal that is indicative of the charge level of the vehicle battery or batteries or power source.

As shown in FIG. 5, the LEDs of the indicator bar 18 may be selectively actuatable or energizable to emit light in a pattern (as viewed from forward or rearward of the mirror assembly) that indicates the battery charge level. For example, all of the LEDs may be energized or electrically powered when the battery charge level is at or near 100 percent, and a center group of two or more LEDs may be not energized (or optionally may be energized in a different color) when the battery charge level is at or near 75 percent, with more of the center LEDs being not energized or electrically powered (or optionally may be energized or electrically powered to emit or provide a different color) when the battery charge level is at or near 50 percent, and only the outermost side LEDs being energized when the battery charge level is at or near or below 25 percent. Thus, a person viewing the mirror assembly can readily determine an approximate charge level of the vehicle battery.

The pattern is across the mirror head, such that the viewer has a width reference when viewing the mirror assembly and indicator from forward or rearward of the mirror assembly. Optionally, the indicator may provide a progress bar indication, with all of the LEDs being energized for full charge level, and with the energized LEDs or bar decreasing in width as the battery charge level decreases.

Thus, when a person views the indicator and mirror head from forward or rearward of the mirror assembly, the indicator is clearly visible to provide the charge level indication. The indicator may comprise a single row of LEDs, with the indicator module and cover element configured so that the single row of LEDs (when the LEDs are energized) emits light both forward and rearward, and with only the end LEDs being viewable from sideward of the mirror assembly. Optionally, the indicator may comprise a forward row of LEDs and a rearward row of LEDs, with the indicator module and cover element configured so that the forward row of LEDs (when the LEDs are energized) emits light forward and the rearward row of LEDs (when the LEDs are energized) emits light rearward. Optionally, the indicator may comprise smaller rows of LEDs along the side regions to provide a charge level indication to a person viewing the side of the mirror assembly, or only the end indicator of the row of LEDs may be visible or viewable to a person viewing from sideward of the mirror assembly. Optionally, the indicator may comprise a single row of LEDs emitting light downward, with optics or lens or light directing means at or incorporated in the lens cover or at or incorporated in a separate component inside the lower part of the mirror head, so as to direct or guide or refract light in the desired direction or directions (e.g., forward and rearward and optionally sideward).

During charging of the vehicle battery, the indicator may, once the battery is fully charged, pulse or change color or otherwise change the indication to indicate that the battery has reached a full charge level. Also, when the charge level drops to a threshold charge level (such as at or below around 25 percent charge), the indicator may intermittently energize the appropriate LEDs (and optionally emitting red light) to alert the driver or user that the battery needs charging. The intermittent indication for a low battery charge level may be provided at initial startup of the vehicle or for a period of time following the charge level reaching the threshold level (so that the indicator is not flashing while the driver is driving the vehicle), and the indicator may continuously operate to flash the appropriate LED or LEDs when the battery charge level reaches a second threshold charge level (such as, for example, 10 percent charge) to alert the driver that the battery is very low and needs charging soon.

The LEDs may comprise a white light-emitting LED or a colored light-emitting LED (such as red light-emitting LEDs and/or or green light-emitting LEDs or the like) to provide the desired appearance of the indicator bar, when the LEDs are electrically powered. Optionally, the LEDs may comprise multi-colored LEDs that are operable or energizable or powerable to emit a variety of colors responsive to a control input or power level at the LEDs, such that, for example, the indicator may emit green light when the vehicle battery is fully or near fully charged, such as above a threshold charge level, and may emit red light when the vehicle battery charge level is low, such as below a threshold charge level. Optionally, a user can select the color of light that is to be emitted by the LED(s) for the desired or customized or personalized appearance of the indicator bar and mirror assembly.

Thus, the indicator bar provides an LED indication at a location where the driver can readily see the indicator when the driver is looking forward, and provides an indication at a location where the vehicle owner or user can readily see the indicator from exterior the vehicle.

The indicator receives a signal (such as wirelessly or from a vehicle communication bus or the like) indicative of the charge level of the vehicle battery and controls or energizes the appropriate ones of the indicators to provide indication of the current battery charge level. Optionally, the indicator may receive other signals (such as wirelessly or from the vehicle communication bus) indicative of a status of one or more other vehicle accessories or systems, such as a security system of the vehicle (where the indicator may emit red light in a continuous or intermittent or episodic manner), a telematics system of the vehicle (where the indicator may emit blue light in a continuous or intermittent or episodic manner), a lighting system of the vehicle (where the indicator may emit white light or other colored light such as when the door of the vehicle is opened or responsive to a user input), and/or the like, and may operate or energize one or more LEDs (to continuously emit light or intermittently emit light) at a particular pattern and/or color and/or intensity to convey to the viewer information pertaining to the other vehicle accessory or system. The indicator may comprise an indicator module or unit that includes the LEDs disposed on a circuit board, which also has a processor or controller that provides the appropriate output to the LEDs based on the received signal.

Optionally, the status indicator bar may operate to provide indication of other vehicle information, such as by emitting different colored light or emitting different patterns of light. For example, the indicator may be utilized as a collision warning type attention-getter, or the indicator may be utilized when the vehicle is operating in an autonomous or semi-autonomous mode that would energize yellow or red (or any color), in order to alert the driver so the driver will look up and be aware, responsive to a recognized oncoming event and/or when the driver needs to retake control of the vehicle. Optionally, the indicator may be used in normal vehicle driving as a supplemental distracted driver alert (and may be combined with or may operate with a driving behavior learning system), and/or the indicator may emit light responsive to determination of a threshold level of inattentiveness of the driver of the equipped electric vehicle. Optionally, the indicator may be used as a generic traffic indicator that may be connected with or in communication with a Google/Waze/Apple traffic system (or the like) to indicate the traffic level ahead of the equipped vehicle, and the indicator may emit green light to indicate light traffic ahead, yellow light to indicate slower traffic ahead, and red light to indicate heavy traffic ahead or slow or stopped traffic ahead. Optionally, the indicator may be used to indicate a construction lane change (such as by the LED's "chasing" left or right across the mirror head) if the vehicle includes processing capabilities to recognize or communicate with temporary traffic control or construction zones. Thus, the indicator may provide indication to the driver of traffic along the road ahead of the equipped vehicle and may provide indication of a traffic shift. The indicator may operate responsive to a GPS system of the vehicle to determine when traffic conditions are along a selected route of the vehicle.

Optionally, the indicator bar may, responsive to other input signals received from one or more other vehicle systems or accessories, provide indication of information pertaining to various vehicle systems, and the indicator bar and control circuitry may utilize aspects of the mirror indicators described in U.S. Publication No. US-2019-0106059, which is hereby incorporated herein by reference in its entirety. The mirror head may comprise a low profile mirror head or caseless mirror head, and may utilize aspects of the mirror assemblies described in U.S. Publication Nos.

US-2019-0146297; US-2019-0047475 and/or US-2015-0334354, which are hereby incorporated herein by reference in their entireties. The indicator may utilize aspects of the indicators and mirror assemblies described in U.S. Pat. Nos. 9,126,525; 9,092,986 and/or 5,530,240, which are hereby incorporated herein by reference in their entireties.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or rounded perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

The mirror assembly may utilize aspects of the mirror assemblies described in U.S. Pat. Nos. 7,626,749; 7,338,177; 7,289,037; 7,274,501; 7,255,451; 7,249,860; 7,195,381; 7,184,190; 6,690,268; 6,501,387; 6,449,082; 6,439,755; 5,253,109; 5,151,816; 5,140,455 and/or 5,066,112, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for an electric vehicle having propulsion powered by a vehicle battery, the interior rearview mirror assembly comprising:

a mirror casing;

a mirror reflective element disposed at the mirror casing;

a mounting structure configured to adjustably mount the mirror reflective element and the mirror casing at an interior portion of the electric vehicle equipped with the interior rearview mirror assembly;

an indicator disposed at the mirror casing at least partially along a perimeter region of the mirror reflective element;

wherein the indicator comprises a plurality of light emitting diodes (LEDs), and wherein each light emitting diode (LED) of the plurality of LEDs is individually electrically powered to emit light;

wherein, with the mirror reflective element and the mirror casing adjustably mounted at the interior portion of the equipped electric vehicle via the mounting structure, and responsive to a battery charge level of the vehicle battery, the indicator electrically powers one or more LEDs of the plurality of LEDs to convey vehicle battery charge level information to a driver of the equipped electric vehicle;

wherein the indicator comprises an indicator bar extending along a lower perimeter region of the mirror reflective element; and wherein the indicator bar is disposed along the lower perimeter region of the mirror casing so as to be viewable, at least when one or more LEDs of the plurality of LEDs is electrically powered, through a windshield of the equipped electric vehicle from forward of the interior rearview mirror assembly.

2. The interior rearview mirror assembly of claim 1, wherein the indicator bar, when at least some LEDs of the plurality of LEDs are electrically powered, is viewable from sideward of the interior rearview mirror assembly.

3. The interior rearview mirror assembly of claim 1, wherein all of the LEDs of the plurality of LEDs are electrically powered responsive to a signal indicative of the vehicle battery being fully charged.

4. The interior rearview mirror assembly of claim 3, wherein some LEDs of the plurality of LEDs at a center region of the indicator are not electrically powered when the vehicle battery charge level drops below a first threshold charge level, and wherein more LEDs of the plurality of LEDs at the center region of the indicator are not electrically powered when the vehicle battery charge level drops below a second threshold charge level, and wherein the second threshold charge level is less than the first threshold charge level.

5. The interior rearview mirror assembly of claim 1, wherein the indicator electrically powers one or more LEDs of the plurality of LEDs responsive to one or more other signals indicative of a status of one or more vehicle accessories or systems of the equipped electric vehicle.

6. The interior rearview mirror assembly of claim 1, wherein the indicator comprises a light transmissive cover element, and wherein light emitted by the plurality of LEDs, when electrically powered, passes through the light transmitting cover.

7. The interior rearview mirror assembly of claim 1, wherein the indicator electrically powers the plurality of LEDs to emit different colors of light responsive to change in vehicle battery charge level.

8. The interior rearview mirror assembly of claim 1, wherein the indicator electrically powers one or more LEDs of the plurality of LEDs to emit light to alert the driver of the equipped electric vehicle of a change in traffic level along a road ahead of the equipped electric vehicle.

9. The interior rearview mirror assembly of claim 1, wherein the indicator electrically powers one or more LEDs of the plurality of LEDs to emit light to alert the driver responsive to determination of a threshold level of inattentiveness of the driver of the equipped electric vehicle.

10. An interior rearview mirror assembly for an electric vehicle having propulsion powered by a vehicle battery, the interior rearview mirror assembly comprising:

a mirror casing;

a mirror reflective element disposed at the mirror casing;

a mounting structure configured to adjustably mount the mirror reflective element and the mirror casing at an interior portion of the electric vehicle equipped with the interior rearview mirror assembly;

an indicator disposed at the mirror casing at least partially along a perimeter region of the mirror reflective element;

wherein the indicator comprises a plurality of light emitting diodes (LEDs), and wherein each light emitting diode (LED) of the plurality of LEDs is individually electrically powered to emit light;

wherein, with the mirror reflective element and the mirror casing adjustably mounted at the interior portion of the equipped electric vehicle via the mounting structure, and responsive to a battery charge level of the vehicle battery, the indicator electrically powers one or more LEDs of the plurality of LEDs to convey vehicle battery charge level information to a driver of the equipped electric vehicle;

wherein the indicator comprises an indicator bar extending along a lower perimeter region of the mirror reflective element; and wherein the indicator comprises a forward row of LEDs and a rearward row of LEDs, and wherein light emitted by the forward row of LEDs, when electrically powered, is viewable by the driver of the equipped electric vehicle, and wherein light emitted by the rearward row of LEDs, when electrically powered, is viewable through a windshield of the equipped electric vehicle from forward of the equipped electric vehicle.

11. The interior rearview mirror assembly of claim 10, wherein one of the forward row of LEDs or the rearward row of LEDs conveys vehicle battery charge level information, and wherein the other of the forward row of LEDs or the rearward row of LEDs indicates a status of one or more vehicle accessories or systems of the equipped electric vehicle.

12. An interior rearview mirror assembly for an electric vehicle having propulsion powered by a vehicle battery, the interior rearview mirror assembly comprising:

a mirror casing;

a mirror reflective element disposed at the mirror casing;

a mounting structure configured to adjustably mount the mirror reflective element and the mirror casing at an interior portion of the electric vehicle equipped with the interior rearview mirror assembly;

an indicator disposed at the mirror casing at least partially along a perimeter region of the mirror reflective element;

wherein the indicator comprises an indicator bar extending along a lower perimeter region of the mirror reflective element;

wherein the indicator comprises a plurality of light emitting diodes (LEDs), and wherein each light emitting diode (LED) of the plurality of LEDs is individually electrically powered to emit light;

wherein the indicator comprises a light transmissive cover element, and wherein light emitted by the plurality of LEDs, when electrically powered, passes through the light transmitting cover;

wherein, with the mirror reflective element and the mirror casing adjustably mounted at the interior portion of the equipped electric vehicle via the mounting structure, and responsive to a battery charge level of the vehicle battery, the indicator electrically powers one or more LEDs of the plurality of LEDs to convey vehicle battery charge level information to a driver of the equipped electric vehicle; and wherein the indicator bar is disposed along the lower perimeter region of the mirror casing so as to be viewable, at least when one or more LEDs of the plurality of LEDs is electrically powered, through a windshield of the equipped electric vehicle from forward of the interior rearview mirror assembly.

13. The interior rearview mirror assembly of claim 12, wherein the indicator bar, when at least some LEDs of the plurality of LEDs are electrically powered, is viewable from sideward of the interior rearview mirror assembly.

14. An interior rearview mirror assembly for an electric vehicle having propulsion powered by a vehicle battery, the interior rearview mirror assembly comprising:

a mirror casing;

a mirror reflective element disposed at the mirror casing;

a mounting structure configured to adjustably mount the mirror reflective element and the mirror casing at an interior portion of the electric vehicle equipped with the interior rearview mirror assembly;

an indicator disposed at the mirror casing at least partially along a perimeter region of the mirror reflective element;

wherein the indicator comprises an indicator bar extending along a lower perimeter region of the mirror reflective element;

wherein the indicator comprises a plurality of light emitting diodes (LEDs), and wherein each light emitting diode (LED) of the plurality of LEDs is individually electrically powered to emit light;

wherein the indicator comprises a light transmissive cover element, and wherein light emitted by the plurality of LEDs, when electrically powered, passes through the light transmitting cover;

wherein, with the mirror reflective element and the mirror casing adjustably mounted at the interior portion of the equipped electric vehicle via the mounting structure, and responsive to a battery charge level of the vehicle battery, the indicator electrically powers one or more LEDs of the plurality of LEDs to convey vehicle battery charge level information to a driver of the equipped electric vehicle; and wherein the indicator comprises a forward row of LEDs and a rearward row of LEDs, and wherein light emitted by the forward row of LEDs, when electrically powered, is viewable by the driver of the equipped electric vehicle, and wherein light emitted by the rearward row of LEDs, when electrically powered, is viewable through a windshield of the equipped electric vehicle from forward of the equipped electric vehicle.

15. The interior rearview mirror assembly of claim 14, wherein one of the forward row of LEDs or the rearward row of LEDs conveys vehicle battery charge level information, and wherein the other of the forward row of LEDs or the rearward row of LEDs indicates a status of one or more vehicle accessories or systems of the equipped electric vehicle.

16. An interior rearview mirror assembly for an electric vehicle having propulsion powered by a vehicle battery, the interior rearview mirror assembly comprising:

a mirror casing;

a mirror reflective element disposed at the mirror casing;

a mounting structure configured to adjustably mount the mirror reflective element and the mirror casing at an interior portion of the electric vehicle equipped with the interior rearview mirror assembly;

an indicator disposed at the mirror casing at least partially along a perimeter region of the mirror reflective element;

wherein the indicator comprises an indicator bar extending along a lower perimeter region of the mirror reflective element;

wherein the indicator comprises a row of a plurality of light emitting diodes (LEDs) arranged along the lower perimeter region of the mirror reflective element, and wherein each light emitting diode (LED) of the plurality of LEDs is individually electrically powered to emit light;

wherein the indicator comprises a light transmissive cover element, and wherein light emitted by the plurality of LEDs, when electrically powered, passes through the light transmitting cover;

wherein, with the mirror reflective element and the mirror casing adjustably mounted at the interior portion of the equipped electric vehicle via the mounting structure, and responsive to a battery charge level of the vehicle battery, the indicator electrically powers one or more LEDs of the plurality of LEDs to convey vehicle battery charge level information to a driver of the equipped electric vehicle;

wherein the indicator electrically powers one or more LEDs of the plurality of LEDs to emit light to alert the driver of the equipped electric vehicle of a change in traffic along a road ahead of the equipped electric vehicle; and wherein the indicator electrically powers the plurality of LEDs in a sequence to indicate direction of a traffic shift along the road ahead of the equipped electric vehicle.

17. The interior rearview mirror assembly of claim 16, wherein the indicator electrically powers one or more LEDs of the plurality of LEDs responsive to one or more other signals indicative of a status of one or more vehicle accessories or systems of the equipped electric vehicle.

18. The interior rearview mirror assembly of claim 16, wherein the indicator is operable to emit light to alert the driver responsive to determination of a threshold level of inattentiveness of the driver of the equipped electric vehicle.

* * * * *